United States Patent
Isogai

(10) Patent No.: US 11,444,560 B2
(45) Date of Patent: Sep. 13, 2022

(54) DRIVE CONTROLLER, SHEET PROCESSING APPARATUS AND LOAD STARTING METHOD

(71) Applicant: KYOCERA Document Solutions Inc., Osaka (JP)

(72) Inventor: Yoji Isogai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/214,304

(22) Filed: Mar. 26, 2021

(65) Prior Publication Data

US 2021/0305925 A1 Sep. 30, 2021

(30) Foreign Application Priority Data

Mar. 27, 2020 (JP) .............................. JP2020-057639

(51) Int. Cl.
*H02P 7/03* (2016.01)
*B65H 37/04* (2006.01)
*H02P 5/68* (2006.01)

(52) U.S. Cl.
CPC ............... *H02P 7/04* (2016.02); *B65H 37/04* (2013.01); *H02P 5/68* (2013.01)

(58) Field of Classification Search
None
See application file for complete search history.

(56) References Cited

U.S. PATENT DOCUMENTS

| 4,623,082 A * | 11/1986 | Kurosawa | B27F 7/36 206/338 |
| 6,127,788 A * | 10/2000 | Yamamoto | H05B 41/2886 315/307 |
| 7,918,374 B2 * | 4/2011 | Gardner | F16B 15/0015 227/5 |
| 2007/0046714 A1 * | 3/2007 | Beak | B41J 2/04555 347/19 |

FOREIGN PATENT DOCUMENTS

| JP | 62254678 A | * 11/1987 | |
| JP | 2001161088 A | 6/2001 | |
| JP | 2012029557 A | * 2/2012 | G03G 15/80 |

* cited by examiner

*Primary Examiner* — Leslie A Nicholson, III
(74) *Attorney, Agent, or Firm* — Studebaker & Brackett PC

(57) ABSTRACT

A drive controller includes a first drive circuit, a first capacitance element and a first processing part and a second processing part. The first drive circuit supplies a current output from a power source to a first load. The first capacitance element is connected to a power supply path between the power source and the first drive circuit. The first processing part is configured to apply a charge from the power source and to charge the first capacitance element before power supply to the first load is started. The second processing part is configured to supply a current output from the power source and a current corresponding to a charge charged in the first capacitance element to the first load through the first drive circuit after the first capacitance element is charged.

11 Claims, 13 Drawing Sheets

DRIVE CONTROLLER, SHEET PROCESSING APPARATUS AND LOAD STARTING METHOD

INCORPORATION BY REFERENCE

This application is based on and claims the benefit of priority from Japanese patent application No. 2020-057639 filed on Mar. 27, 2020, which is incorporated by reference in its entirety.

BACKGROUND

The present disclosure relates to a drive controller, a sheet processing apparatus including the drive controller and a load starting method.

In a sheet processing apparatus such as a printer, a load such as a motor is driven by power supply from a power source. There is also known a motor driving method capable of reducing electric power required for driving the motor by using a regenerative current generated by the motor.

By the way, in the above described sheet processing apparatus, with increasing in the load, the current supplied from the power source is increased, and especially, a current (a starting current) flowing at a starting time becomes maximum. In such an apparatus in which a large current flows through the load, it is required to select a power source and members having a large rated current. This causes a problem in increasing of the cost of the apparatus.

SUMMARY

In accordance with an aspect of the present disclosure, a drive controller includes a first drive circuit, a first capacitance element and a first processing part and a second processing part. The first drive circuit supplies a current output from a power source to a first load. The first capacitance element is connected to a power supply path between the power source and the first drive circuit. The first processing part is configured to apply a charge from the power source and to charge the first capacitance element before power supply to the first load is started. The second processing part is configured to supply a current output from the power source and a current corresponding to a charge charged in the first capacitance element to the first load through the first drive circuit after the first capacitance element is charged.

In accordance with an aspect of the present disclosure, a sheet processing apparatus includes the drive controller, the first load and a staple part. The staple part performs a staple processing on a sheet stack placed on a sheet placement part. The first load is a motor used to drive the staple part.

In accordance with an aspect of the present disclosure, a load starting method is performed in a drive controller including a first drive circuit which supplies a current output from a power source to a first load and a first capacitance element connected to a power supply path between the power source and the first drive circuit. The load starting method includes a step to apply a charge from the power source and to charge the first capacitance element before power supply to the first load is started; and a step to supply a current output from the power source and a current corresponding to a charge charged in the first capacitance element to the first load through the first drive circuit after the first capacitance element is charged.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the attached drawings, an embodiment in the present disclosure will be described. The following embodiments are embodied examples of the present disclosure and are not intended to limit the technical scope of the present disclosure.

Figure 2:
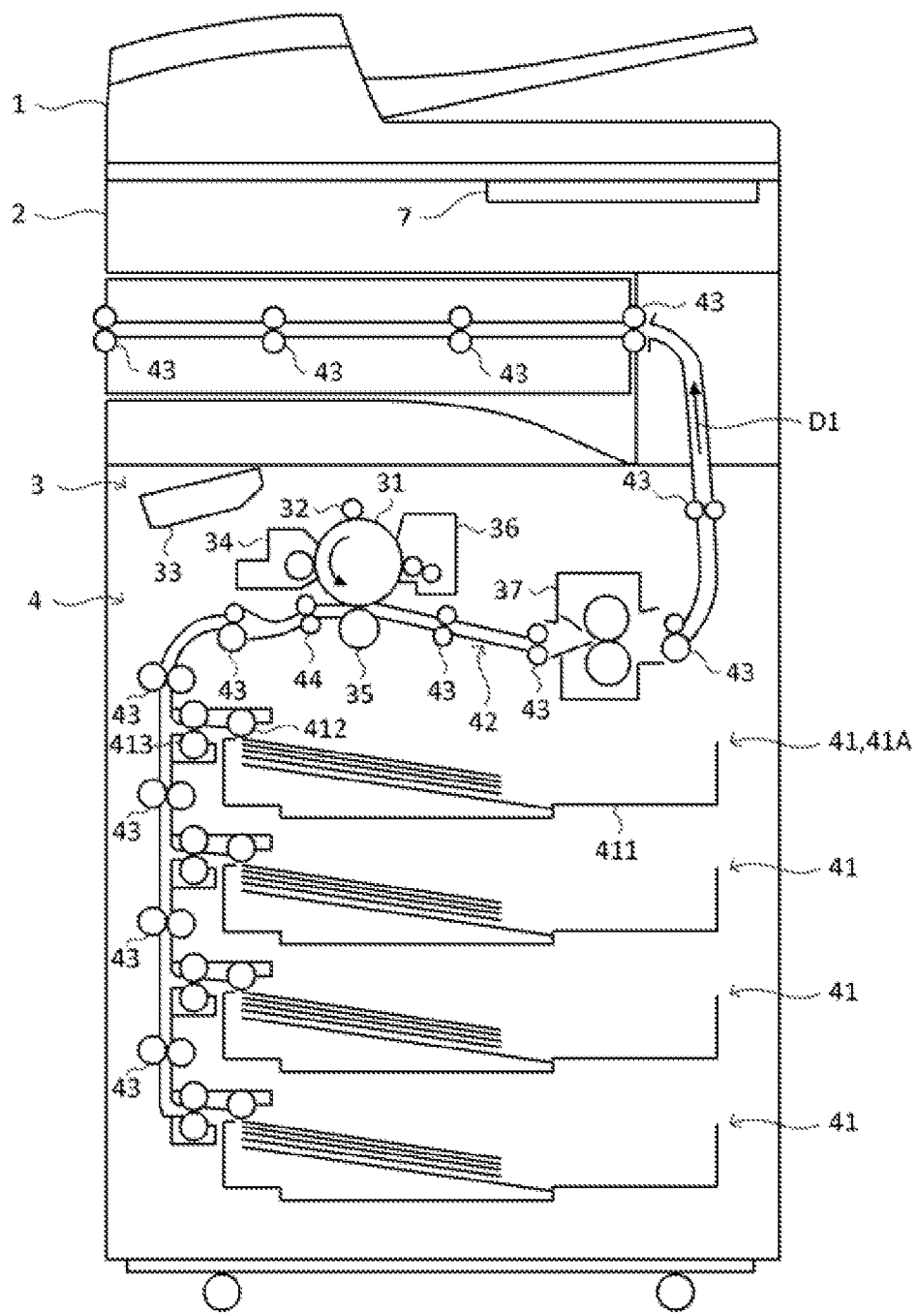
FIG. 2 is a sectional view showing a structure of a part of the image forming apparatus according to the embodiment of the present disclosure.
Figure 3:
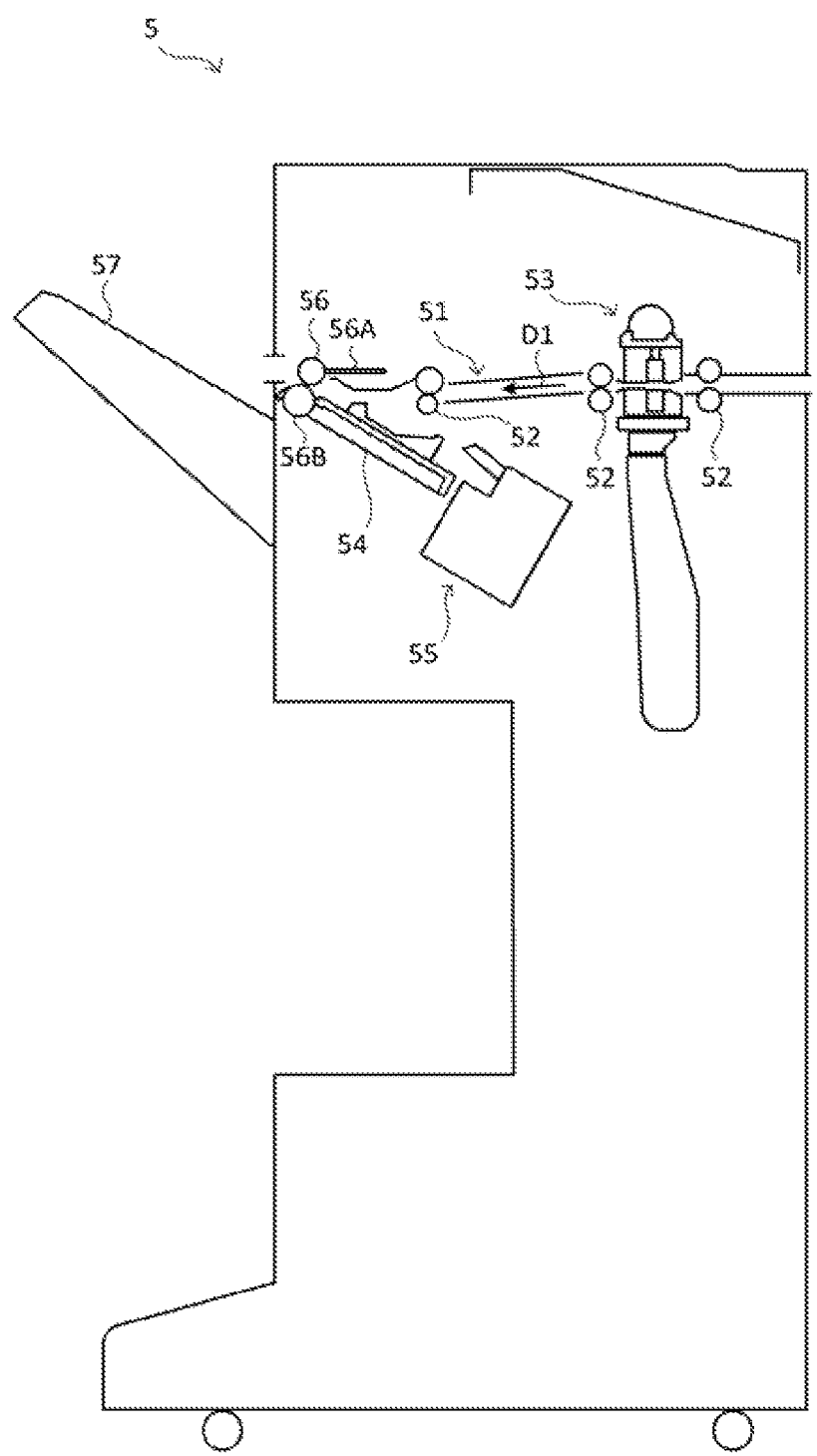
FIG. 3 is a sectional view showing a structure of a part of the image forming apparatus according to the embodiment of the present disclosure.
Figure 4:
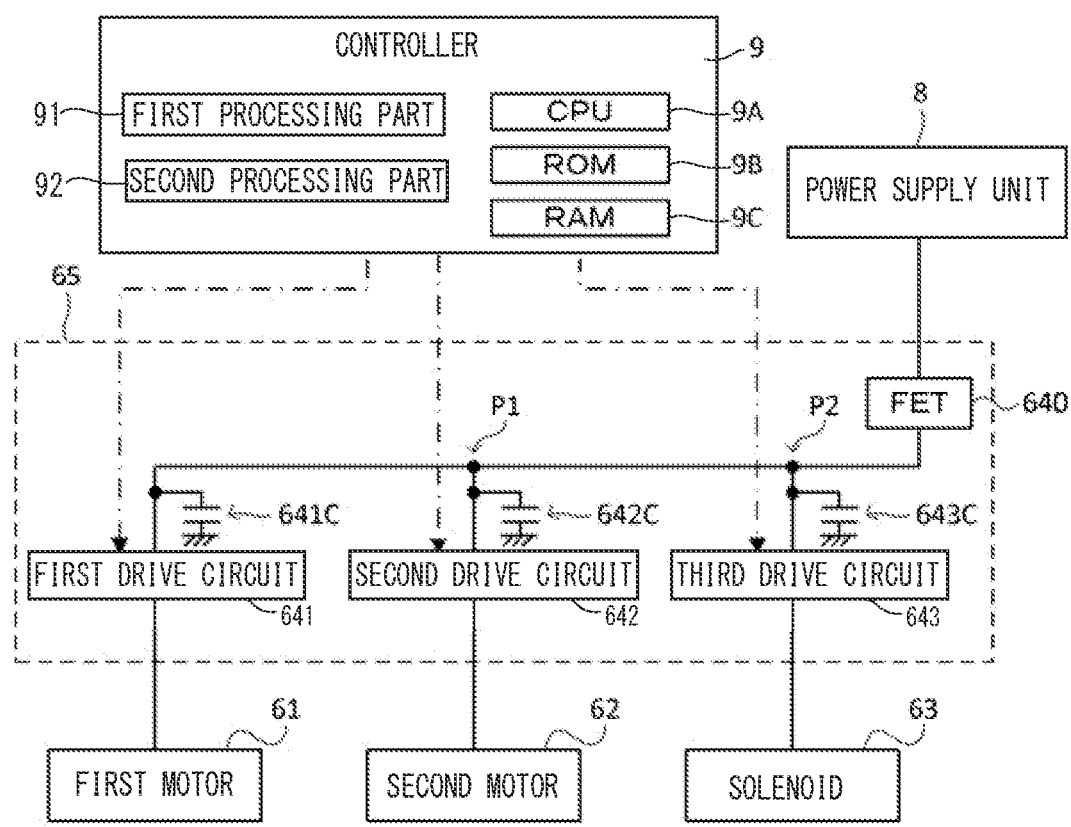
FIG. 4 is a block diagram showing a structure of a part of the image forming apparatus according to the embodiment of the present disclosure.

First, with reference to FIG. 1 to FIG. 4, a structure of an image forming apparatus 10 according to the embodiment of the present disclosure will be described. FIG. 2 is a sectional view showing a structure of an image forming part 3 and a sheet conveyance part 4. FIG. 3 is a sectional view showing a structure of a post processing apparatus 5. FIG. 4 is a view showing a structure of a part of the post processing apparatus 5, a power supply unit 8 and a controller 9. In FIG. 4, a control signal output from the controller 9 is shown by a one-dotted chain line arrow.

The image forming apparatus 10 is a multifunctional peripheral including various functions, such as a scanning function for reading an image of a document and obtaining an image data, a printing function for forming an image based on the image data, a facsimile function and a copying function. The image forming apparatus 10 is an example of a sheet processing apparatus in the present disclosure. The image forming apparatus 10 may be a printing apparatus, a facsimile apparatus or a copying apparatus.

Figure 1:
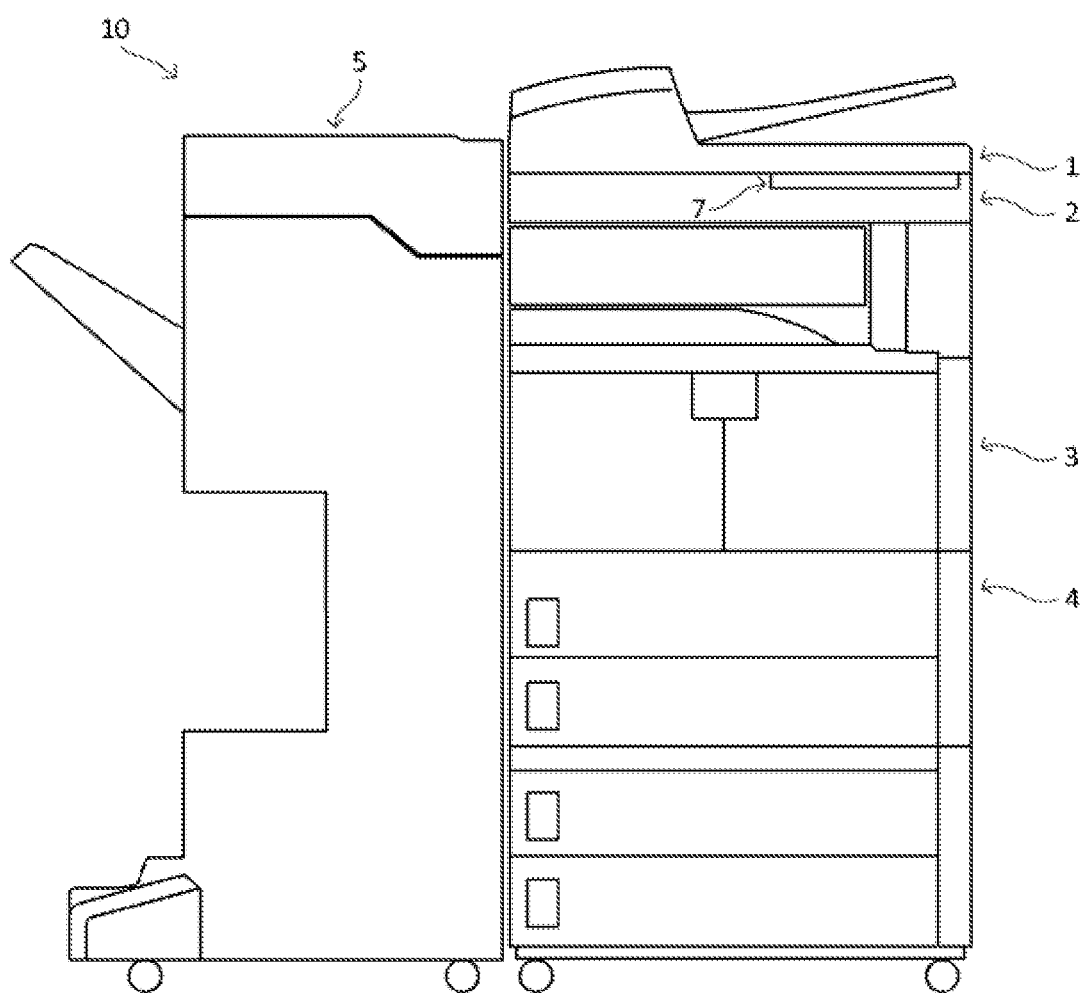
FIG. 1 is a front view showing an external structure of an image forming apparatus according to one embodiment of the present disclosure.

As shown in FIG. 1 and FIG. 4, the image forming apparatus 10 includes an automatic document feeder (ADF) 1, an image reading part 2, the image forming part 3, the sheet conveyance part 4, the post processing apparatus 5, an operation display part 7, the power supply unit 8 and the controller 9.

The ADF 1 includes a document placement part, a plurality of conveyance rollers, a document pressing member and a sheet discharge part, and conveys a document which is to be read by the document reading part 2. The document reading part 2 includes a document placement table, a light source, a plurality of mirrors, an optical lens and a CCD, and is capable of obtaining an image data of the document.

The image forming part 3 is capable of forming an image in an electrophotographic manner based on the image data obtained by the image reading part 2. The image forming part 3 is also capable of forming an image based on an image data input from an information processing device such as an external personal computer. As shown in FIG. 2, the image forming part 3 includes a photosensitive drum 31, a charging device 32, an optical scanning device 33, a development device 34, a transferring roller 35, a cleaning device 36 and a fixing part 37.

The sheet conveyance part 4 conveys the sheet to the post processing apparatus 5 through an image forming position in the image forming part 3. As shown in FIG. 2, the sheet conveyance part 4 includes four sheet feeding units 41, a first conveyance path 42, a plurality of conveyance rollers 43 and a resist roller 44.

Each of the four sheet feeding units 41 includes a sheet feeding cassette 411, a pickup roller 412 and a sheet feeding roller 413. In the sheet feeding cassette 411, the sheet on which the image is to be formed is placed. For example, the sheet placed on the sheet feeding cassette 411 may contain a paper, a coated paper, a postcard, an envelope, and an OHP sheet. The pickup roller 412 conveys the uppermost sheet of the sheets placed on the sheet feeding cassette 411 to the sheet feeding roller 413. The sheet feeding roller 313 conveys the sheet conveyed by the pickup roller 412 to the first conveyance path 42.

The first conveyance path 42 is a sheet moving path communicating each sheet feeding cassette 411 with the post processing apparatus 5. The first conveyance path 42 is formed by a pair of guide members provided in a casing of the image forming apparatus 10. On the first conveyance path 42, the conveyance rollers 43 and the resist roller 44 used to convey the sheet are provided. In the sheet conveyance part 4, the sheet is conveyed by the conveyance rollers 43 and the resist roller 44 in a conveyance direction D1 shown in FIG. 2.

In the image forming part 3, the image is formed on the sheet conveyed from the sheet conveyance part 4 in the following manner.

First, a surface of the photosensitive drum 31 is uniformly charged at a predetermined electric potential by the charging device 32. Next, the surface of the photosensitive drum 31 is emitted with light by the optical scanning device 33 based on the image data. Then, an electrostatic latent image corresponding to the image data is formed on the surface of the photosensitive drum 31.

Then, the electrostatic latent image formed on the surface of the photosensitive drum 31 is developed (visualized) to a toner image by the development device 34. The toner image developed by the development device 34 is conveyed to a transferring position (the above image forming position) by the transferring roller 35 with the rotation of the photosensitive drum 31 in a direction shown by the arrow in FIG. 2. To the development device 34, the toner is replenished from a toner container (not shown) attachable to and detachable from the image forming part 3.

On the other hand, the sheet conveyance part 4 conveys the sheet to the above image forming position in parallel with the image forming operation in the image forming part 3. For example, when a sheet feeding source is set to the sheet feeding cassette 411 in the sheet feeding unit 41A (refer to FIG. 2) among the four sheet feeding units 41, the sheets placed in the sheet feeding cassette 411 are lifted by a lift plate (not shown) provided on a bottom plate of the sheet feeding cassette 411 to a contact position with the pickup roller 412. The pickup roller 412 feeds the uppermost sheet of the sheets lifted up by the lift plate. The sheet fed by the pickup roller 412 is conveyed to the first conveyance path 42 by the sheet feeding roller 413. The sheet conveyed to the first conveyance path 42 by the sheet feeding roller 413 is conveyed to the resist roller 44 by the conveyance roller 43.

The resist roller 44 sends the sheet to the image forming position with a conveyance timing of the toner image by the photosensitive drum 31. For example, a sensor (not shown) for detecting a passing of the sheet is provided on an upstream side of the position of the resist roller 44 in the conveyance direction D1. The controller 9 sets a sending timing of the sheet by the resist roller 44 so as to match the conveyance timing, based on a detection timing of the passing of the sheet by the sensor. The resist roller 44 sends the sheet to the image forming position based on the sending timing set by the controller 9. Thus, on the surface of the sheet sent to the image forming position at the sending timing, the toner image conveyed at the conveyance timing is transferred by the transferring roller 35.

The toner remaining on the surface of the photosensitive drum 31 after the toner image is transferred by the transferring roller 35 is removed by the cleaning device 36. For example, in the cleaning device 36, the toner remaining on the surface of the photosensitive drum 31 is removed by a blade-shaped cleaning member. The toner removed by the cleaning member is conveyed by a conveyance screw to a toner storage container (not shown) and then collected.

The sheet on which the toner image is transferred at the image forming position is conveyed to the fixing part 37 by the conveyance roller 43. In the fixing part 37, the toner image transferred on the sheet is heated and pressed by a heating roller and a pressure roller. Thus, the toner image is melted and fixed to the sheet. The sheet to which the toner image is fixed is conveyed to the post processing apparatus 5 by the conveyance roller 43.

The operation display part 7 includes a display part, such as a liquid crystal display, displaying various information according to control instructions from the controller 9, and an operation part, such as an operation key and a touch panel, by which various information is input to the controller 9 according to user operation.

The post processing apparatus 5 performs post processing, such as punching processing and staple processing, on the sheet conveyed from the sheet conveyance part 4 after the image informing. As shown in FIG. 3, the post processing apparatus 5 includes a second conveyance path 51, a plurality of conveyance rollers 52 (an example of a conveyance roller in the present disclosure), a punching part 53, a stack tray 54 (an example of a sheet placement part in the present disclosure), a staple part 55, a discharge roller 56 and a discharge tray 57. The post processing apparatus 5 further includes a first motor 61, a second motor 62, a solenoid 63 and a control board 65, as shown in FIG. 4.

The second conveyance path 51 is a sheet moving path communicating the first conveyance path 42 with the discharge tray 57. On the second conveyance path 51, the plurality of conveyance rollers 52 used to convey the sheet is provided. The plurality of conveyance rollers 52 conveys the sheet to the stack tray 54. In the post processing apparatus 5, the sheet is conveyed by the plurality of conveyance rollers 52 in the conveyance direction D1 shown in FIG. 3.

The punching part 53 is provided on the second conveyance path 51, and performs the punching processing which punches the sheet conveyed along the second conveyance path 51. The stack tray 54 is provided on a downstream side of the punching part 53 in the conveyance direction D1. On the stack tray 54, the sheets conveyed from the sheet feeding cassette 411 are stacked. The staple part 55 performs the staple processing which staples the sheets stacked on the stack tray 54. The discharge roller 56 conveys the sheet stack to which the staple processing is performed and then discharges the sheet stack from the stack tray 54 to the discharge tray 57. The discharge roller 56 is supported by an arm 56A so as to be displaceable in a direction separated away from a driven roller 56B.

The first motor 61 is used to drive the staple part 55. For example, the first motor 61 is a DC brush motor.

As shown in FIG. 4, the first motor 61 is connected to the power supply unit 8 through a first drive circuit 641. The first motor 61 is a load whose starting current is maximum, among the loads to which electric power is supplied from the power supply unit 8. The first motor 61 is an example of a first load in the present disclosure. The first motor 61 may not be the load whose starting current is maximum, among the loads to which electric power is supplied from the power supply unit 8.

Figure 5:
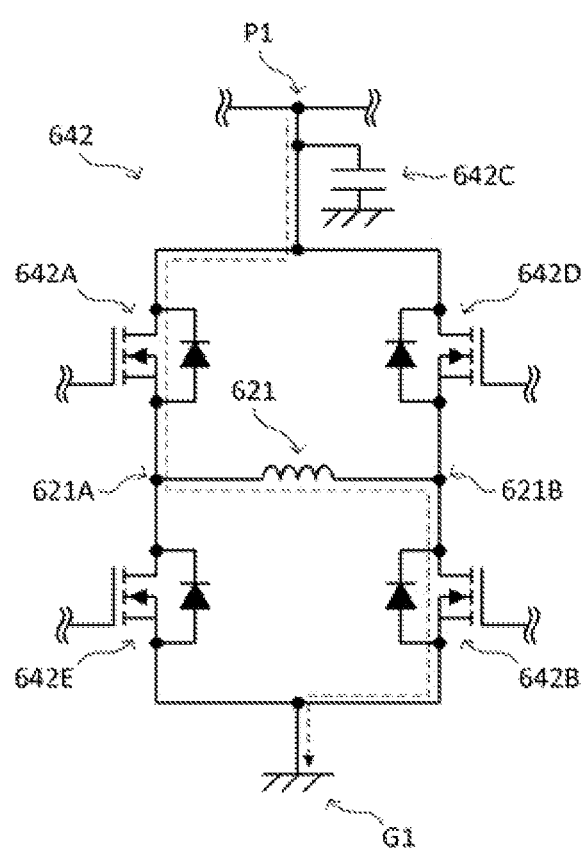
FIG. 5 is a circuit diagram showing a structure of a second drive circuit in the image forming apparatus according to the embodiment of the present disclosure.

The second motor 52 is used to drive the component, such as the plurality of conveyance rollers 52, of the post processing apparatus 5. For example, the second motor 62 is a stepping motor. The second motor 62 includes a coil 621 shown in FIG. 5. The second motor 62 may be another type of motor, such as a DC brush motor.

As shown in FIG. 4, the second motor 62 is connected to the power supply unit 8 through a second drive circuit 642 and a confluent position P1 on a power supply path from the power supply unit 8 to the first motor 61. The second motor 62 starts at a starting current smaller than that of the first motor 61. The second motor 62 is an example of a second load in the present disclosure. The post processing apparatus 5 may include a plurality of the second motors 62.

The solenoid 63 is used to drive the component, such as the arm 56A, of the post processing apparatus 5. The solenoid 63 includes a coil 631 shown in FIG. 6.

As shown in FIG. 4, the solenoid 63 is connected to the power supply unit 8 through a third drive circuit 643 and a confluent position P2 on the power supply path from the power supply unit 8 to the second motor 62. The solenoid 63 starts at a starting current smaller than that of the first motor 61. The solenoid 63 is an example of the second load in the present disclosure. The post processing apparatus 5 may include a plurality of the solenoids 63.

On the control board 65, an electronic circuit for controlling the first motor 61, the second motor 62 and the solenoid 63 is mounted. As shown in FIG. 4, the control circuit 65 includes the first drive circuit 641, the second drive circuit 642 and the third drive circuit 643.

The second drive circuit 642 can switch power supply and no power supply from the power supply unit 8 to the second motor 62. Specifically, the second drive circuit 642 can switch power supply and no power supply to the coil 621 included in the second motor 62. Further, the second drive circuit 642 can supply a regenerative current generated after the power supply to the coil 621 (refer to FIG. 5) is stopped, to the first motor 61 through the first drive circuit 641. For example, the second drive circuit 642 is an H-bridge circuit including N channel type MOSFETs 642A, 642B, 642E and 642D.

The MOSFET 642A is a switching element provided on a current path between the confluent position P1 and one end 621A of the coil 621. Specifically, the MOSFET 642A is provided such that a drain terminal is connected to the confluent position P1 and a drain terminal of the MOSFET 642D, a gate terminal is connected to the controller 9, and a source terminal is connected to the one end 621A of the coil 621 and a drain terminal of the MOSFET 642E. The MOSFET 642A includes a parasitic diode which flows current in one direction from the one end 621A of the coil 621 to the confluent position P1. The MOSFET 642A is an example of a first switching element in the present disclosure.

The MOSFET 642B is a switching element provided on a current path between the other end 621B of the coil 621 and a ground G1 of the power supply unit 8. Specifically, the MOSFET 642B is provided such that a drain terminal is connected to the other end 621B of the coil 621 and a source terminal of the MOSFET 642D, a gate terminal is connected to the controller 9, and a source terminal is connected to the ground G1 and a source terminal of the MOSFET 642E. The MOSFET 642B includes a parasitic diode which flows current in one direction from the ground G1 to the other end 621B of the coil 621.

The MOSFET 642E is a switching element provided on a current path between the ground G1 and the one end 621A of the coil 621. Specifically, the MOSFET 642E is provided such that the drain terminal is connected to the one end 621A of the coil 621 and the source terminal of the MOSFET 642A, a gate terminal is connected to the controller 9, and the source terminal is connected to the ground G1 and the source terminal of the MOSFET 642B. The MOSFET 642E includes a parasitic diode which flows current in one direction from the ground G1 to the one end 621A of the coil 621. That is, the MOSFET 642E functions as a rectifier which flows current in one direction from the ground G1 to the one end 621A of the coil 621.

The MOSFET 642D is a switching element provided on a current path between the other end 621B of the coil 621 and the confluent position P1. Specifically, the MOSFET 642D is provided such that the drain terminal is connected to the confluent position P1 and the drain terminal of the MOSFET 642A, a gate terminal is connected to the controller 9, and the source terminal is connected to the other end 621B of the coil 621 and the drain terminal of the MOSFET 642B. The MOSFET 642D includes a parasitic diode which flows current in one direction from the other end 621B of the coil 621 to the confluent position P1. That is, the MOSFET 642D functions as a rectifier which flows current in one direction from the other end 621B of the coil 621 to the confluent position P1.

Figure 6:
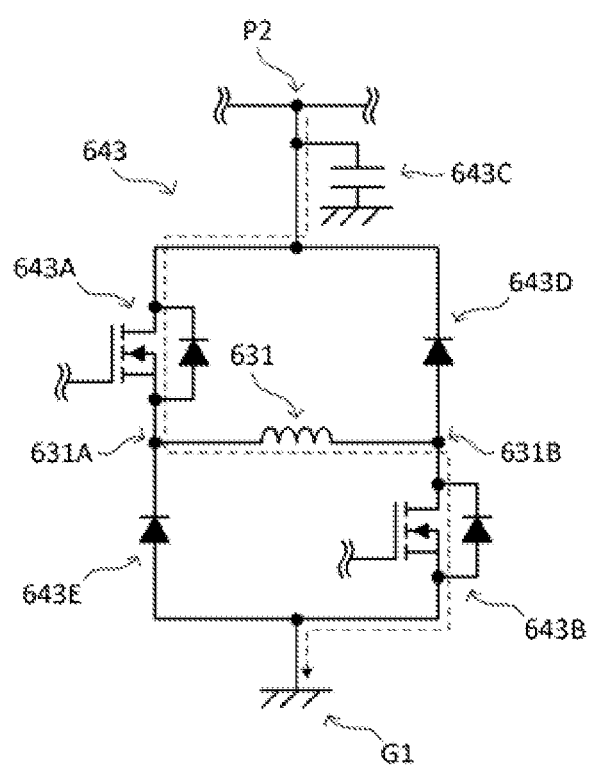
FIG. 6 is a circuit diagram showing a structure of a third drive circuit in the image forming apparatus according to the embodiment of the present disclosure.

The third drive circuit 643 can switch power supply and no power supply from the power supply unit 8 to the solenoid 63. Specifically, the third drive circuit 643 can switch power supply and no power supply to the coil 631 included in the solenoid 63. The third drive circuit 643 further can supply a regenerative current generated after the power supply to the coil 631 is stopped, to the first motor 61 through the first drive circuit 641. For example, as shown in FIG. 6, the third drive circuit 643 includes N channel type MOSFETs 643A, 643B, and diodes 643E, 643D. The third drive circuit 643 is another example of the second drive circuit in the present disclosure.

The MOSFET 643A is a switching element provided on a current path between the confluent position P2 and one end 631A of the coil 631. Specifically, the MOSFET 643A is provided such that a drain terminal is connected to the confluent position P2 and a cathode terminal of the diode 643D, a gate terminal is connected to the controller 9, and a source terminal is connected to the one end 631A of the coil 631 and a cathode terminal of the diode 643E. The MOSFET 643A includes a parasitic diode which flows current in one direction from the one end 631A of the coil 631 to the confluent position P2.

The MOSFET 643B is a switching element provided on a current path between the other end 631B of the coil 631 and the ground G1. Specifically, the MOSFET 643B is provided such that a drain terminal is connected to the other end 631B of the coil 631 and an anode terminal of the diode 643D, a gate terminal is connected to the controller 9, and a source terminal is connected to the ground G1 and an anode terminal of the diode 643E. The MOSFET 643B includes a parasitic diode which flows current in one direction from the ground G1 to the other end 631B of the coil 631.

The diode 643E is provided on a current path between the ground G and the one end 631A of the coil 631, and is a rectifier which flows current in one direction from the ground G to the other end 631B of the coil 631. Specifically, the diode 643E is provided such that the anode terminal is connected to the ground G1 and the source terminal of the MOSFET 643B, and the cathode terminal is connected to the one end 631A of the coil 631 and the source terminal of the MOSFET 643A.

The diode 643D is provided on a current path between the other end 631B of the coil 631 and the confluent position P2, and is a rectifier which flows current in one direction from the other end 631B of the coil 631 to the confluent position P2. Specifically, the diode 643D is provided such that the anode terminal is connected to the other end 631B of the coil 631 and the drain terminal of the MOSFET 643B, and the cathode terminal is connected to the confluent position P2 and the drain terminal of the MOSFET 643A.

The first drive circuit 641 can switch power supply and no power supply from the power supply unit 8 to the first motor 61. Specifically, the first drive circuit 641 can switch power supply and no power supply to the coil included in the first motor 61. For example, the first drive circuit 641 is the same H-bridge circuit as the second drive circuit 642, for example. The explanation of the first drive circuit 641 is omitted because it has the same structure as the second drive circuit 642.

The power supply unit 8 supplies electric power to the first motor 61, the second motor 62 and the solenoid 63. For example, the power supply unit 8 includes an AC-DC converter which converts a 100V AC voltage supplied from an external power source into a DC voltage of a predetermined voltage value. The power supply unit 8 is an example of a power source in the present disclosure.

As shown in FIG. 4, on the power supply path between the power supply unit 8, and the first drive circuit 641, the second drive circuit 642 and the third drive circuit 643, an FET 640 (a field effect transistor) for regulating current flowing through the power supply path is provided. The FET 640 is an example of a current regulating element in the present disclosure. Between the FET 640 and the first drive circuit 641, a capacitor 641C is provided, between the FET 640 and the second drive circuit 64, a capacitor 642C is provided, and between the FET 640 and the third drive circuit 643, a capacitor 643C is provided. The FET 640, the capacitors 641C, 642C and 643C will be described in detail later. Each of the capacitors 641C, 642C, and 643C is provided for stabilizing the electric power supplied to the corresponding drive circuits.

The controller 9 includes control devices such as a CPU 9A, a ROM 9B, and a RAM 9C. The CPU 9A is a processor for executing various kinds of arithmetic processing. The ROM 9B is a nonvolatile storage device in which information, such as control program for causing the CPU 9A to execute the various processing, is previously stored. The RAM 9C is a volatile storage device used as a temporary storage memory (a work area) for the various processing executed by the CPU 9A. In the controller 9, the CPU 9A executes various control programs previously stored in the ROM 9B. Thus, the image forming apparatus 10 is totally controlled by the controller 9. The controller 9 may be an electronic circuit, such as an integrated circuit (ASIC), or may be a controller provided separately from the main controller for totally controlling the image forming apparatus 10.

The controller 9 can control the driving of the first motor 61, the second motor 62 and the solenoid 63.

Specifically, the controller 9 inputs a control signal to the first drive circuit 641 to switch a circuit state of the first drive circuit 641 and to control the driving of the first motor 61.

Further, the controller 9 inputs a control signal to the second drive circuit 642 to switch a circuit state of the second drive circuit 642 and to control the driving of the second motor 62. The control signal input to the second drive circuit 642 is a signal input to the gate terminal of the MOSFET included in the second drive circuit 642.

Further, the controller 9 inputs a control signal to the third drive circuit 643 to switch a circuit state of the third drive circuit 643 and to control the driving of the solenoid 63. The control signal input to the third drive circuit 643 is a signal input to the gate terminal of the MOSFET included in the third drive circuit 643.

Figure 11:
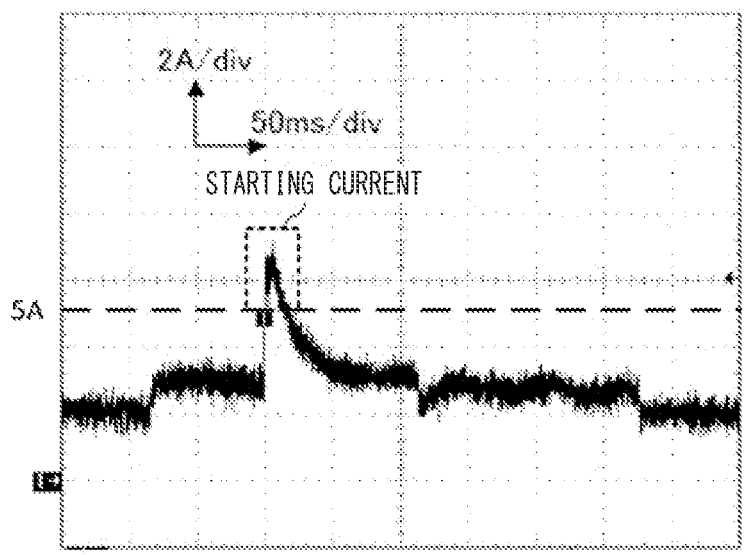
FIG. 11 is a graph showing a current waveform of a first motor in the image forming apparatus according to the embodiment of the present disclosure.

By the way, in the image forming apparatus 10, when the first motor 61 starts, a current (a starting current) flowing through the power supply unit 8 becomes maximum (refer to FIG. 11). Due to the current flowing through the power supply unit 8 at a time of the starting of the first motor 61, malfunction, such as heat generation and failure of inside members, may occur in the power supply unit 8. In a case where the power source constructed by members having a large rated current is used in order to avoid the malfunction, the cost of the members of the apparatus may increase only for the purpose of avoiding the temporarily large current.

On the other hand, in the image forming apparatus 10 according to the embodiment of the present disclosure, as described below, it becomes possible to suppress a current (a starting current) flowing from the power supply unit 8 at the time of the starting of the first motor 61. Hereinafter, an example 1 and an example 2 of the image forming apparatus 10 will be described. The present disclosure may apply one of the example 1 and the example 2, or may combine both the example 1 and the example 2 and apply them.

First, the example 1 will be described. Specifically, the controller 9 includes a first processing part 91 and a second processing part 92 as shown in FIG. 4. The controller 9 executes the control program stored in the ROM 9B using the CPU 9A. Thus, the controller 9 serves as the first processing part 91 and the second processing part 92. The apparatus including the control board 65 and the controller 9 is an example of a drive controller in the present disclosure.

The first processing part 91 controls the second drive circuit 642 and the third drive circuit 643 before the starting of the first motor 61 to start the power supply from the power supply unit 8 to the coil 621 and the coil 631.

Specifically, the first processing part 91 controls the MOSFETs 642A, 642B, 642E and 642D included in the second drive circuit 642 to start the power supply from the power supply unit 8 to the coil 621.

More specifically, the first processing part 91 switches the MOSFETs 642A and 642B of the second drive circuit 642 to an ON state, and switches the MOSFETs 642E and 642D to an OFF state. Thus, current flows from the power supply unit 8 to the ground G1 through the confluent position P1, the MOSFET 642A, the coil 621, and the MOSFET 642B (refer to the broken line arrow in FIG. 5).

In a case where the load including the coil 621 is a stepping motor, compared with a case where the load is another kind of motor, such as a DC brush motor, it becomes possible to accumulate electric power without rotating the drive shaft. That is, it becomes possible to accumulate electric power in the coil 621 without wearing the members forming the load.

Further, the first processing part 91 controls the MOSFETs 643A and 643B included in the third drive circuit 643 to start the power supply from the power supply unit 8 to the coil 631.

More specifically, the first processing part 91 switches the MOSFETs 643A and 643B of the third drive circuit 643 to an ON state. Thus, current flows from the power supply unit 8 to the ground G1 through the confluent position P2, the MOSFET 643A, the coil 631, and the MOSFET 643B (refer to the broken line arrow in FIG. 6).

After the starting of the power supply from the power supply unit 8 to the coil 621 and the coil 631, the second processing part 92 controls the second drive circuit 642 and the third drive circuit 643 to supply a regenerative current generated in the coil 621 and the coil 631 to the first motor 61, and controls the first drive circuit 641 to start the power supply from the power supply unit 8 to the first motor 61 and to start the first motor 61.

Specifically, the second processing part 92 controls the MOSFET 642A of the second drive circuit 642 to stop the power supply from the power supply unit 8 to the coil 621, and controls the MOSFET 642B to supply the regenerative current generated in the coil 621 to the first motor 61.

Figure 7:
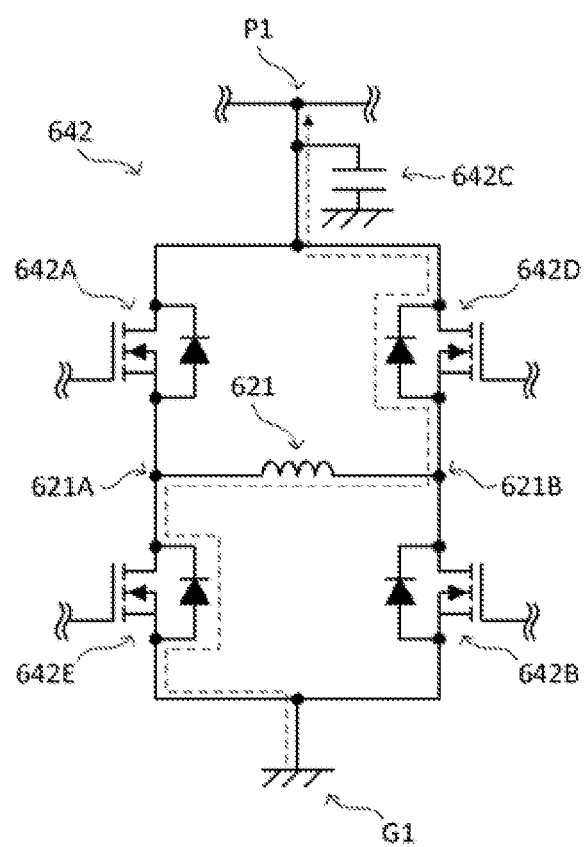
FIG. 7 is a circuit diagram showing a structure of the second drive circuit in the image forming apparatus according to the embodiment of the present disclosure.
Figure 8:
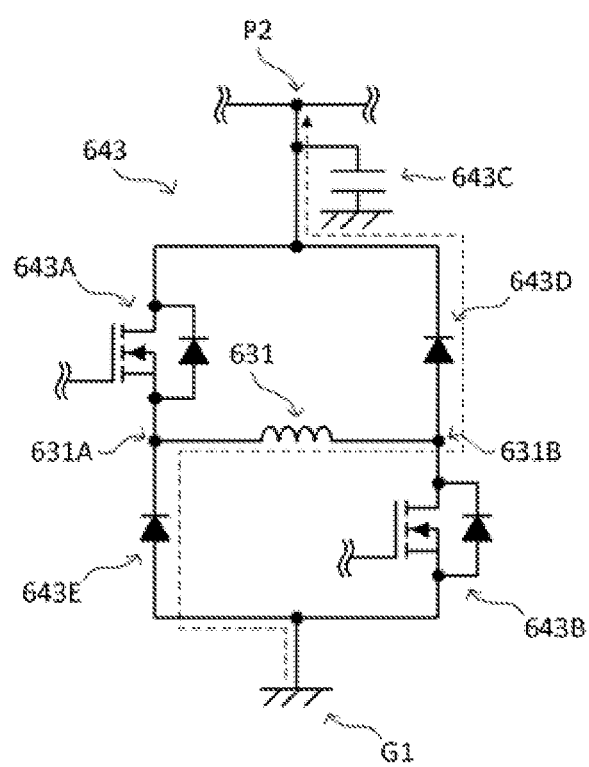
FIG. 8 is a circuit diagram showing a structure of the third drive circuit in the image forming apparatus according to the embodiment of the present disclosure.

More specifically, the second processing part 92 switches the MOSFETs 642A, 642B, 642E and 642D to the OFF state. Thus, the power supply from the power supply unit 8 to the coil 621 is stopped, a back electromotive force is generated in the coil 621, and a regenerative current flows from the ground G1 to the confluent position P1 through the parasitic diode of the MOSFET 642E, the coil 621, and the parasitic diode of the MOSFET 642D (refer to the broken line arrow in FIG. 7). Therefore, the regenerative current generated in the coil 621 flows through the first motor 61.

Further, the second processing part 92 controls the MOSFET 643A of the third drive circuit 643 to stop the power supply from the power supply unit 8 to the coil 631, and controls the MOSFET 643B to supply the regenerative current generated in the coil 631 to the first motor 61.

More specifically, the second processing part 92 switches the MOSFETs 643A and 643B to the OFF state. Thus, the power supply from the power supply unit 8 to the coil 631 is stopped, a back electromotive force is generated in the coil 631, and a regenerative current flows from the ground G1 to the confluent position P2 through the diode 643E, the coil 631 and the diode 643D (refer to the broken line arrow in FIG. 7). Therefore, the regenerative current generated by the coil 631 flows through the first motor 61.

For example, the second processing part 92 is configured to supply the two regenerative currents generated in the coils 621 and 631 to the first motor 61 sequentially. For example, the second processing part 92 is configured to start the power supply from the power supply unit 8 to the first motor 61, and to supply the regenerative current generated in the coil 621 to the first motor 61. Then, the second processing part 92 is configured to supply the regenerative current generated in the coil 631 to the first motor 61 at a predetermined timing after the starting of the power supply from the power supply unit 8 to the first motor 61. For example, the timing is a timing at which the regenerative current generated in the coil 621 is lower than the predetermined reference value.

The second processing part 92 may be configured to supply the two regenerative currents generated in the coil 621 and the coil 631 to the first motor 61 at the same time.

Further, the first processing part 91 may control only one of the second drive circuit 642 and the third drive circuit 643 to start the power supply from the power supply unit 8 to the coil included in the drive circuit to be controlled. In this case, the second processing part 92 may be configured to supply the regenerative current generated in the coil to the first motor 61, and to control the first drive circuit 641 to start the power supply from the power supply unit 8 to the first motor 61 and to start the first motor 61. Further, the controller 9 may switch the coil for which the power supply is started by the first processing part 91 between the coil 621 and the coil 631 each time when a predetermined switching timing arrives. Further, when the controller 9 selects one or a plurality of coils for which the power supply is started by the first processing part 91 from the plurality of coils, the controller 9 may select one or a plurality of coils for which the power supply is started by the first processing part 91, based on the usage state of the plurality of second loads. For example, the controller 9 may select, from the coils corresponding to the second load that are not used among the plurality of coils corresponding to the plurality of second loads, the coil for which the power supply is started by the first processing part 91 until the predetermined number is satisfied, and when all the coils corresponding to the second loads that are not used are selected, the controller 9 may select, from the coils corresponding to the second loads that are in use, the coil for which the power supply is started by the first processing unit 91 until the predetermined number is satisfied.

As described above, in the image forming apparatus 10 according to the example 1, the current of the power supply unit 8 and the two regenerative currents generated in the coil 621 of the second motor 62 and the coil 631 of the solenoid 63 are supplied to the first motor 61 to start the first motor 61. Thereby, it becomes possible to suppress a large amount of current (the starting current) flowing from the power supply unit 8 at the time of the starting of the first motor 61.

The first motor 61, the second motor 62 and the solenoid 63 may be a load driving the component of the image forming part 3 or the sheet conveyance part 4.

Next, the example 2 will be described. As with the image forming apparatus 10 of the example 1, FIG. 4 shows the structure of the image forming apparatus 10 in the example 2. In the image forming apparatus 10 in the example 2, the first processing part 91 starts the power supply from the power supply unit 8 to the capacitors 641C, 642C and 643C before the first motor 61 is started. The capacitor 641C is connected to the power supply path between the power supply unit 8 and the first drive circuit 641, the capacitor 642C is connected to the power supply path between the power supply unit 8 and the second drive circuit 642, and the capacitor 643C is connected to the power supply path between the power supply unit 8 and the third drive circuit 643. The capacitor 641C is provided corresponding to the first drive circuit 641, the capacitor 642C is provided corresponding to the second drive circuit 642, and the capacitor 643C is provided corresponding to the third drive circuit 643. The capacitor 641C is an example of a first capacitance element in the present disclosure, and the capacitors 642C and 643C are examples of a second capacitance element in the present disclosure.

Specifically, the first processing part 91 controls the FET 640 to start the power supply from the power supply unit 8 to the capacitors 641C, 642C and 643C. That is, the first processing part 91 controls the FET 640 to supply current from the power supply unit 8 and to charge the capacitors 641C, 642C and 643C before the power supply to the first motor 61 is started.

Figure 9:
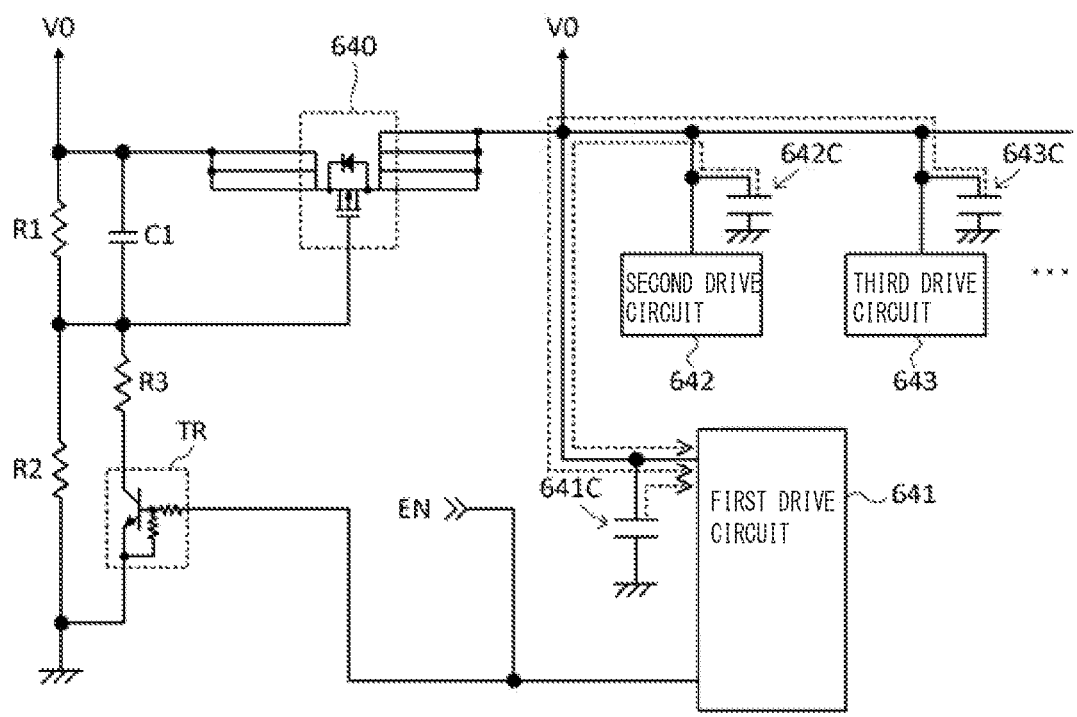
FIG. 9 is a circuit diagram showing a structure of a control board in the image forming apparatus according to the embodiment of the present disclosure.

FIG. 9 is a circuit diagram showing the control board 65. As shown in FIG. 9, the FET 640 is connected to the power supply path downstream the power supply unit 8 and upstream the first drive circuit 641, the second drive circuit 642 and the third drive circuit 643. A source terminal of the FET 640 is connected to the power supply unit 8, and a gate terminal of the FET 640 is connected to the power supply unit 8 through a resistor R1. The resistor R1 is provided between the gate terminal and the source terminal of the FET 640, one end of the resistor R1 is connected to the power supply unit 8 and the source terminal of the FET 640, and the other end of the resistor R1 is connected to the gate terminal of the FET 640. Between the gate terminal and the source terminal of the FET 640, a capacitor C1 (an example of a capacitance element in the present disclosure) is provided. Between the gate terminal and the source terminal of the FET 640, a predetermined voltage is applied from the power supply unit 8.

Further, to the gate terminal of the FET 640 and the other end of the resistor R1, one end of each of resistors R2 and R3 is connected. The other end of the resistor R2 is connected the ground, and the other end of the resistor R3 is connected to a collector terminal of a transistor TR. An emitter terminal of the transistor TR is connected to the other end of the resistor R2 and the ground, and to a base terminal of the transistor TR, a drive signal EN for starting the first motor 61 is input. The drive signal EN (an enable signal) is a low active signal in which the first motor is driven by a low level signal, for example.

The resistors R1 and R2 are connected in series, the resistors R1 and R3 are connected in series, and the resistors R2 and R3 are connected in parallel. Then, to the gate terminal of the FET 640, a divided voltage obtained by dividing the voltage output from the power supply unit 8 by the resistors R1, R2 and R3 is input. For example, in a case where the transistor TR is in an ON state, the divided voltage V1 obtained by dividing the output voltage by the resistor R1 and a combined resistance of the resistors R2 and R3 is applied between the gate terminal and the source terminal of the FET 640. In a case where the transistor TR is in an OFF state, the voltage V2 (V2<V1) obtained by dividing the output voltage by the resistor R1 and the resistor R2 is applied between the gate terminal and the source terminal of the FET 640.

The drain terminal of the FET 640 is connected each of an input terminal of the first drive circuit 641, an input terminal of the second drive circuit 642 and an input terminal of the third drive circuit 643. Between the drain terminal of the FET 640 and the input terminal of the first drive circuit 641, one end of the capacitor 641C is connected, and the other end of the capacitor 641C is connected to the ground. Between the drain terminal of the FET 640 and the input terminal of the second drive circuit 642, one end of the capacitor 642C is connected, and the other end of the capacitor 642C is connected to the ground. Between the drain terminal of the FET 640 and the input terminal of the third drive circuit 643, one end of the capacitor 643C is connected, and the other end of the capacitor 643 is connected to the ground.

The FET 640 regulates the maximum current flowing through the power supply path to a first current value before the power supply to the first motor 61 is started, and regulates the maximum current flowing through the power supply path to a second current value after the capacitors 641C, 642C and 643C are charged.

The second processing part 92 is configured to supply a current output from the power supply unit 8 and a current corresponding to the charge charged in the capacitors 641C, 642C and 643C to the first motor 61 through the first drive circuit 641 after the capacitors 641C, 642C and 643C are charged.

Then, an operation of the control board 64 will be described using specified embodiments.

First, the first processing part 91 starts the power supply from the power supply unit 8 to the control board 65. For example, the power supply unit 8 outputs a 24V voltage. The second processing part 92 inputs a high level signal EN (H) (an example of a first control signal in present disclosure) to the control board 65. When the drive signal EN (H) is input to the base terminal of the transistor TR, the transistor TR is switched in the ON state, and the resistors R2 and R3 are connected in parallel. Thus, the divided voltage (an example of a first voltage in the present disclosure) obtained by dividing the voltage (24H) of the power supply unit 8 by the resistor R1 and the combined resistance of the resistors R2 and R3 is applied between the gate terminal and the source terminal of the FET 640. When the resistance value of the resistor R1 is 20 kΩ, the resistance value of the resistor R2 is 200 kΩ, and the resistance value of the resistor R3 is 200 kΩ, the voltage between the gate terminal and the source terminal is about 4 V. Since the capacitor C1 is provided between the gate terminal and the source terminal, the voltage between the gate terminal and the source terminal gradually increases to about 4 V according to a time constant of the capacitor C1. That is, when the power supply unit 8 starts the power supply, the FET 640 gradually shifts to the ON state, and the current gradually flows to the downstream side. Thus, an inrush current to the capacitors 641C, 642C and 643C are prevented, and the capacitors 641C, 642C, 643C are gently charged.

Figure 10:
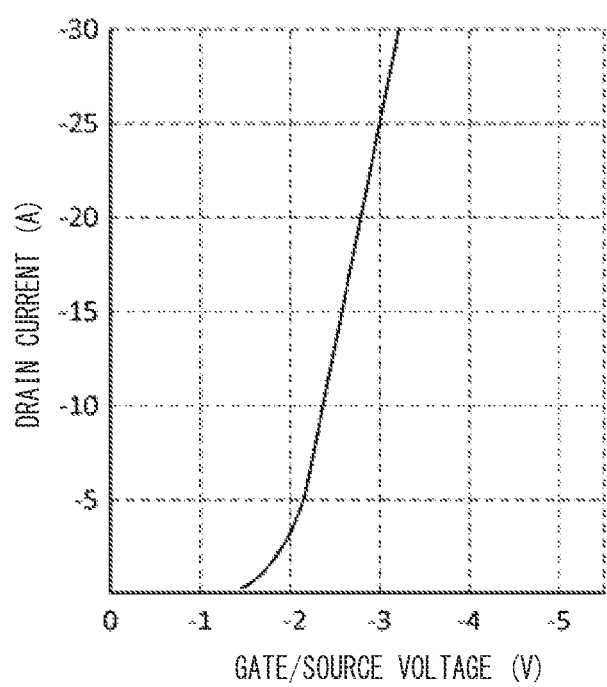
FIG. 10 is a graph showing a current characteristic of a FET in the image forming apparatus according to the embodiment of the present disclosure.

As shown in a current characteristic of the FET 640 in FIG. 10, the larger the voltage between the gate terminal and the source terminal, the larger the drain current, and when the voltage between the gate terminal and the source terminal is equal to or smaller than a predetermined value, the drain current becomes almost zero.

When the capacitors 641C, 642C and 643C are charged, the second processing part 92 inputs a low level drive signal EN (L) (an example of a second control signal in the present disclosure) to the control board 65. When the drive signal EN (L) is input to the control board 65, the first motor 61 is started and the transistor TR is switched to the OFF state. Thus, the current does not flow through the resistor R3, and the divided voltage (an example of a second voltage in the present disclosure) obtained by dividing the voltage (24V) of the power supply unit 8 by the resistor R1 and the resistor R2 is applied between the gate terminal and the source terminal of the FET 640. In the above example, a voltage between the gate terminal and the source terminal is decreased to above 2.2 V. In a case where the voltage between the gate terminal and the source terminal is about 2.2 V, according to the current characteristic shown in FIG. 10, a drain current of the FET 640 is about 5 A. That is, after the driving of the first motor 61, the drain current is regulated to about 5 A.

As described above, the FET 640 regulates the maximum current flowing through the power supply path to the first current value in a case where the drive signal EN (H) which switches the first motor 61 to the OFF state is input, and regulates the maximum current flowing through the power supply path to the second current value (about 5 A) in a case where the drive signal EN (L) which switches the first motor 61 to the ON state is input. Specifically, in a case where a voltage between the source terminal and the gate terminal is a first voltage (about 4 V) corresponding to the drive signal EN (H), the FET 640 regulates the maximum current flowing through the power supply path from the drain terminal to the first current value, and regulates the maximum current flowing through the power supply path from the drain terminal to the second current value (about 5 A) in a case where a voltage between the source terminal and the gate terminal is the second voltage (about 2.2 V) corresponding to the drive signal EN (L).

As shown by a current waveform of the first motor 61 in FIG. 11, a starting current at the time of the starting of the first motor 61 exceeds 5 A. Then, as the above example, when the current supplied from the FET 640 is regulated to about 5 A, a current at the time of the starting of the first motor 61 is insufficient. Then, in the present example, a shortage current exceeding 5 A is replenished with the charge charged in the capacitors 641C, 642C and 643C before the first motor 61 is started (refer to the dotted line arrow in FIG. 9). The charge amount corresponding to the shortage current corresponds to an area (here, about 20 mC (mile coulomb)) of a triangle waveform within the dotted line frame shown in FIG. 11.

When the first motor 61 allows voltage drop of 5V, that is, allows driving at 19V, if a sum of capacitance of the capacitors 641C, 642C and 643C satisfies 4000 μF (=20 mC/5V), a charge amount dischargeable from the capacitors 641C, 642C and 643C is 20 mC, so that the first motor 61 becomes drivable.

As described above, in the image forming apparatus 10 according to the example 2, at the time of starting of the first motor 61, the current supplied from the power supply unit 8 is regulated to the predetermined current value, and the charge charged in the capacitors 641C, 642C, and 643C provided in the first drive circuit 641, the second drive circuit 642, and the third drive circuit 643 is discharged to start the first motor 61. Specifically, the second processing part 92 causes the capacitors 641C, 642C, and 643C to discharge the charge corresponding to a differential current between a required current value and the second current value, and to supply the discharged charge to the first motor 61. Thus, it becomes possible to suppress a large current (a starting current) flowing from the power supply unit 8 at the time of the starting of the first motor 61. Therefore, since it is not necessary to select the power supply unit 8 and the components having a large rated current, the cost increase of the image forming apparatus 10 can be suppressed. It should be noted that at least one capacitor may be used to compensate for the current shortage, but it is preferable that a plurality of the capacitors is used.

In the above configuration, the charge charged in the capacitors of the respective drive circuits provided on the control board 65 is supplied to the first motor 61 at the time of starting of the first motor 61, but the present disclosure is not limited to this configuration. For example, as shown in FIG. 12, in the image forming apparatus 10, the charge charged in the capacitors of at least two or more of the drive circuits provided in the control board 65 may be supplied to the first motor 61 at the time of the starting of the first motor 61.

Figure 12:
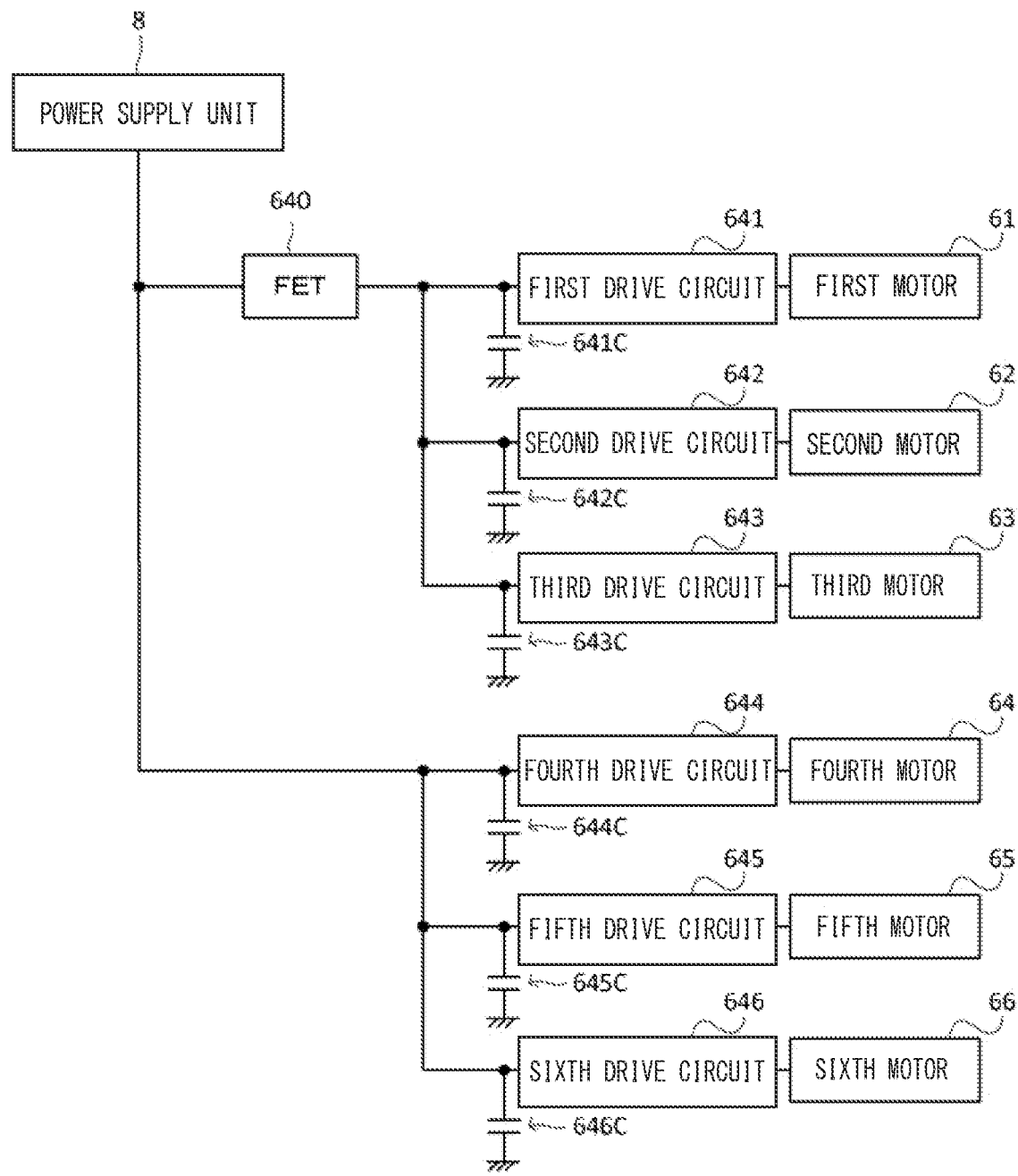
FIG. 12 is a circuit diagram showing a structure of the control board in the image forming apparatus according to the embodiment of the present disclosure.

Specifically, as shown in FIG. 12, of the six drive circuits 641 to 646 provided in the control board 65, the charge charged in the capacitors 641C to 643C to 643C of the three drive circuits 641 to 643 is supplied to the first motor 61 at the time of the starting of the first motor 61.

Figure 13:
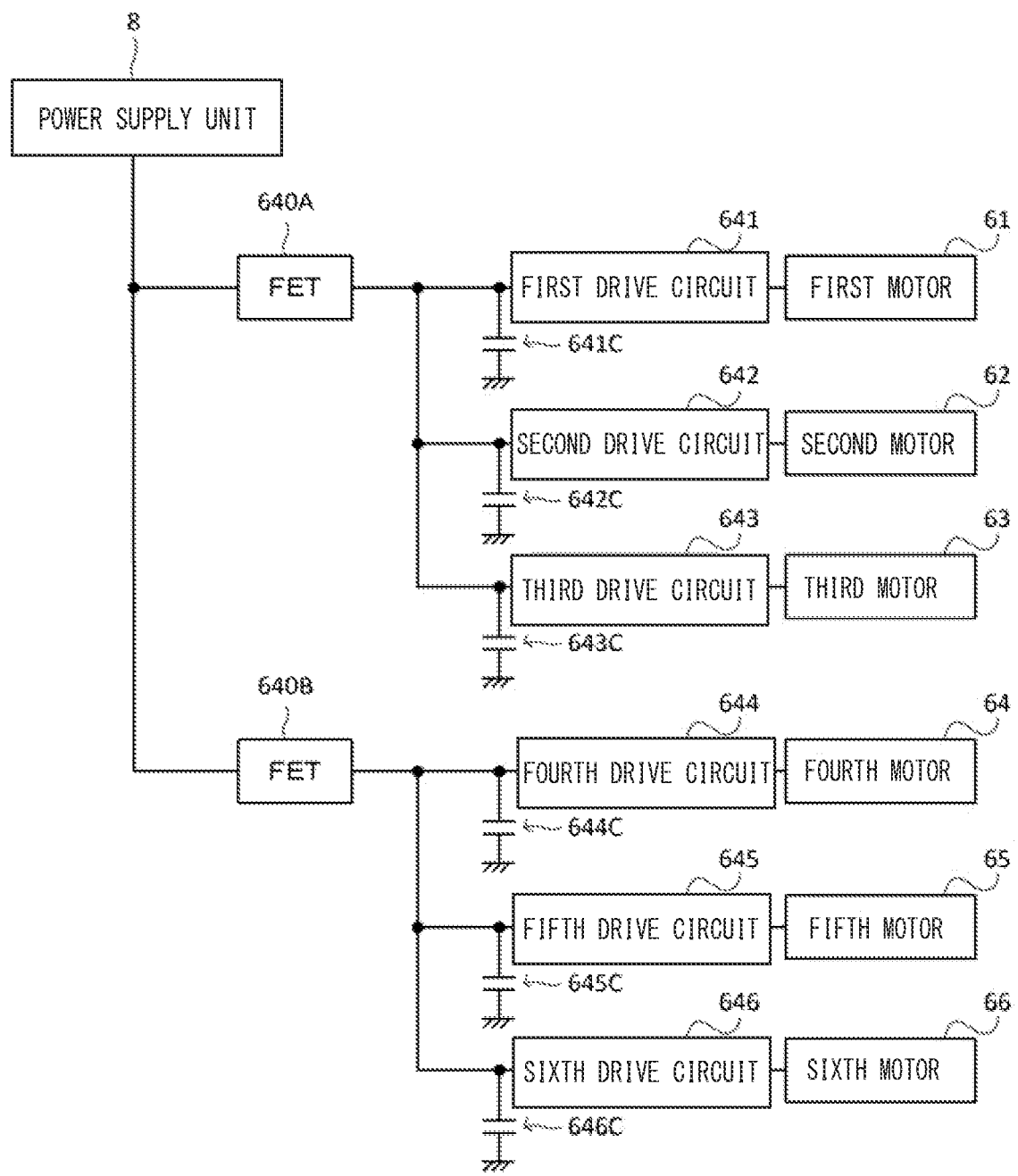
FIG. 13 is a circuit diagram showing a structure of the control board in the image forming apparatus according to the embodiment of the present disclosure.

Further, in a case where there are a plurality of loads (the motor or the like) that generates a large starting current, as shown in FIG. 13, the image forming apparatus 10 may regulate the current by the FET 640 for each load to supply the capacitor charge. For example, when a large starting current is generated in each of the first motor 61 and the fourth motor 64, as shown in FIG. 13, the two FETs 640A and 640B are provided. The first drive circuit 641, the second drive circuit 642, the third drive circuit 643, and the capacitors 641C, 642C and 643C are connected to the FET 640A, and the fourth drive circuit 644, the fifth drive circuit 645, and the sixth drive circuit 646, and the capacitors 644C, 645C and 646C are connected to the FET 640B.

At the time of the starting of the first motor 61, current supplied from the power supply unit 8 is regulated to a predetermined current value by the FET 640A, and the charge charged in the capacitors 641C, 642C and 643C provided in the first drive circuit 641, the second drive circuit 642 and the third drive circuit 643 are discharged, to start the first motor 61. At the time of the starting of the fourth motor 64, the current supplied from the power supply unit 8 is regulated to a predetermined current value by the FET 640B, and the charge charged to the capacitors 644C, 645C and 646C provided in the fourth drive circuit 644, the fifth drive circuit 645, and the sixth drive circuit 646 is discharged, to start the fourth motor 64.

The image forming apparatus in the present disclosure may combine the first example and the second example described above. Thus, for example, the regenerative current generated from the drive circuit according to the configuration of the first example and the charge discharged from the capacitor according to the configuration of the second example are supplied to the first motor 61. In the image forming apparatus 10 in which the example 1 and the example 2 are combined, the current amount of the regenerative current and the charge amount of the charge may be adjusted according to the current amount required when the first motor 61 is started. Thus, for example, by increasing the regenerative current, the charge that needs to be compensated from the capacitor can be decreased, so that the capacitance of the capacitor can be decreased.

The present disclosure may be modified as appropriate within a range that it does not conflict with the gist or idea of the disclosure which can be read from the claims and the entire specification, and that the drive controller, the sheet processing apparatus, and the load starting method accompanying such modification are also included in the technical idea of the present disclosure.

The invention claimed is:

1. A drive controller comprising:
a first drive circuit which supplies a current output from a power source to a first load;
a first capacitance element connected to a power supply path between the power source and the first drive circuit;
a first processing part configured to apply a charge from the power source and to charge the first capacitance element before power supply to the first load is started; and
a second processing part configured to supply a current output from the power source and a current corresponding to a charge charged in the first capacitance element to the first load through the first drive circuit after the first capacitance element is charged.

2. The drive controller according to claim 1, further comprising:
a second drive circuit which supplies a current output from the power source to a second load; and
a second capacitance element connected to the power supply path between the power source and the second drive circuit, wherein
the first capacitance element is provided corresponding to the first drive circuit,
the second capacitance element is provided corresponding to the second drive circuit,
the first processing part is configured to apply a charge from the power source and to charge the first capacitance element and the second capacitance element before the power supply to the first load is started; and
the second processing part is configured to supply a current output from the power source and a current corresponding to a charge charged in the first capacitance element and the second capacitance element to the first load through the first drive circuit after the first capacitance element and the second capacitance elements are charged.

3. The drive controller according to claim 2, further comprising:
a current regulating element connected to the power supply path between the power source, and the first capacitance element and the second capacitance element and regulating a current flowing through the power supply path, wherein
the current regulating element regulates a maximum current flowing through the power supply path to a first current value before the power supply to the first load is started, and regulates the maximum current flowing through the power supply path to a second current value after the first capacitance element and the second capacitance element are charged.

4. The drive controller according to claim 3, wherein
the current regulating element is configured to regulate the maximum current flowing through the power supply path to the first current value in a case where a first control signal which switches the first load to an OFF state is input, and to regulate the maximum current flowing through the power supply path to the second current value in a case where a second control signal which switches the first load to an ON state is input.

5. The drive controller according to claim 4, wherein
the current regulating element includes an electric field transistor,
the electric field transistor is provided such that a source terminal is connected to the power source and a drain terminal is connected to each of the first drive circuit and the second drive circuit,
the electric field transistor regulates a maximum current flowing from the drain terminal to the first current value in a case where a voltage between the source terminal and a gate terminal is a first voltage corresponding to the first control signal, and regulates a maximum current flowing from the drain terminal to the second current value in a case where the voltage between the source terminal and the gate terminal is a second voltage corresponding to the second control signal.

6. The drive controller according to claim 5, wherein
a capacitance element is provided between the source terminal and the gate terminal, and
a voltage between the source terminal and the gate terminal is gradually increased to the first voltage by the capacitance element.

7. The drive controller according to claim 3, wherein
the second processing part is configured to cause the first capacitance element and the second capacitance element to discharge a charge corresponding to a differential current between a required current value and the second current value.

8. The drive controller according to claim 2, wherein
the second load starts at a starting current smaller than the first load.

9. The drive controller according to claim 5, wherein
the first current value is set to be larger as a voltage between the source terminal and the gate terminal is large, and
the second current value is set to a constant value.

10. A sheet processing apparatus comprising:
the drive controller according to claim 1;
the first load; and
a staple part performing a staple processing on a sheet stack placed on a sheet placement part, wherein
the first load is a motor used to drive the staple part.

11. A load starting method performed in a drive controller including a first drive circuit which supplies a current output from a power source to a first load and a first capacitance element connected to a power supply path between the power source and the first drive circuit, the load starting method comprising:
a step to apply a charge from the power source and to charge the first capacitance element before power supply to the first load is started; and
a step to supply a current output from the power source and a current corresponding to a charge charged in the first capacitance element to the first load through the first drive circuit after the first capacitance element is charged.

* * * * *